(12) United States Patent
Li et al.

(10) Patent No.: US 10,282,006 B2
(45) Date of Patent: May 7, 2019

(54) TOUCH SUBSTRATE HAVING A PRESSURE SENSOR AND METHOD FOR DRIVING THE SAME, DISPLAY APPARATUS

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Changfeng Li, Beijing (CN); Xiaochuan Chen, Beijing (CN); Haisheng Wang, Beijing (CN); Yingming Liu, Beijing (CN); Xiaoliang Ding, Beijing (CN); Shengji Yang, Beijing (CN); Weijie Zhao, Beijing (CN); Wei Liu, Beijing (CN); Pengpeng Wang, Beijing (CN); Lei Wang, Beijing (CN); Pengcheng Lu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 45 days.

(21) Appl. No.: 15/533,979

(22) PCT Filed: May 23, 2016

(86) PCT No.: PCT/CN2016/082964
§ 371 (c)(1),
(2) Date: Jun. 7, 2017

(87) PCT Pub. No.: WO2017/166404
PCT Pub. Date: Oct. 5, 2017

(65) Prior Publication Data
US 2018/0101268 A1 Apr. 12, 2018

(30) Foreign Application Priority Data

Mar. 29, 2016 (CN) .......................... 2016 1 0187227

(51) Int. Cl.
*G06F 3/041* (2006.01)
*G06F 3/047* (2006.01)
*G02F 1/1333* (2006.01)

(52) U.S. Cl.
CPC ............ *G06F 3/0412* (2013.01); *G06F 3/047* (2013.01); *G06F 3/0414* (2013.01);
(Continued)

(58) Field of Classification Search
CPC .................... G06F 3/0414; G06F 3/041–3/047
See application file for complete search history.

(56) References Cited

U.S. PATENT DOCUMENTS

2014/0362000 A1  12/2014 Seo et al.
2015/0070305 A1*  3/2015 Seo .................. G06F 3/0412
                                                    345/174
(Continued)

FOREIGN PATENT DOCUMENTS

CN          102314248 A     1/2012
CN          102483658 A     5/2012
(Continued)

OTHER PUBLICATIONS

First Office Action dated May 9, 2018 corresponding to Chinese application No. 201610187227.0.
(Continued)

*Primary Examiner* — Laurence J Lee
(74) *Attorney, Agent, or Firm* — Nath, Goldberg & Meyer; Joshua B. Goldberg

(57) ABSTRACT

Provided are a touch substrate and a method for driving the same, and a display apparatus. The touch substrate includes
(Continued)

a base substrate, and a plurality of touch control units, gate lines and read lines disposed on the base substrate. Each touch control unit includes a first electrode plate, a piezoelectric material layer and a second electrode plate sequentially disposed on the base substrate. The gate lines are configured to provide a constant voltage to the first electrode plates during a touch control period. The read lines are configured to read out an amount of charges generated by the piezoelectric material layers so as to determine a position of a touch point.

15 Claims, 3 Drawing Sheets

(52) U.S. Cl.
CPC ........ *G06F 3/0416* (2013.01); *G02F 1/13338* (2013.01); *G06F 2203/04112* (2013.01)

(56) References Cited

U.S. PATENT DOCUMENTS

2016/0253010 A1 9/2016 Xu
2017/0090630 A1* 3/2017 Kim ..................... G06F 3/0412

FOREIGN PATENT DOCUMENTS

| CN | 103728762 A | 4/2014 |
| CN | 104407466 A | 3/2015 |
| CN | 105373271 A | 3/2016 |
| EP | 2472363 A1 | 7/2012 |
| EP | 2985681 A1 | 2/2016 |

OTHER PUBLICATIONS

International Search Report dated Jan. 11, 2017 in corresponding International Application No. PCT/CN2016/082964 along with an English translation of the International Search Report and an English translation of the Written Opinion of the International Searching Authority.

* cited by examiner

TOUCH SUBSTRATE HAVING A PRESSURE SENSOR AND METHOD FOR DRIVING THE SAME, DISPLAY APPARATUS

This is a National Phase Application filed under 35 U.S.C. 371 as a national stage of PCT/CN2016/082964, filed May 23, 2016, an application claiming the benefit of Chinese Application No. 201610187227.0, filed Mar. 29, 2016, the content of each of which is hereby incorporated by reference in its entirety.

FIELD

The present invention belongs to the field of display technology, and specifically relates to a touch substrate and a method for driving the same, and a display apparatus.

BACKGROUND

A touch control screen, due to its advantages such as ease of operation, visualization and flexibility, has become a popular human-computer interaction means for personal mobile communication device and integrated information terminal (e.g., tablet computers, smart phones, super notebook computers, etc.). Depending on different principles of touch control, touch control screens can be divided into four main types of resistive touch control screen, capacitive touch control screen, infrared touch control screen and surface acoustic wave (SAW) touch control screen. A capacitive touch control screen has a multi-touch function, and has an excellent user experience with fast response, long lifetime and high light transmittance. With gradual development of the process, the yield of the capacitive touch control screen has been significantly improved, and its price has been increasingly reduced, thereby becoming a mainstream technology for touch control interaction of small and medium-sized information terminal.

However, it has been found that there is a lack of realizing display with touch control by using pressure sensors in the field of touch control. Accordingly, the present disclosure provides, inter alia, a technical solution of adopting, in the touch control screen, a pressure sensor with piezoelectric material.

SUMMARY

In view of the above problems in the existing touch control screens, the present disclosure provides a touch substrate having a pressure sensor, a method for driving the same, and a display apparatus.

According to one aspect of the present disclosure, there is provided a touch substrate including a base substrate, and a plurality of touch control units and a plurality of gate lines disposed on the base substrate, wherein the touch substrate further includes a plurality of read lines disposed on the base substrate; each of the touch control units includes a first electrode plate, a piezoelectric material layer and a second electrode plate sequentially disposed on the base substrate; the first electrode plate is connected to one of the plurality of gate lines, and the second electrode plate is connected to one of the plurality of read lines; each of the gate lines is configured to provide, during a touch control period, a constant voltage to the first electrode plate connected therewith; and each of the read lines is configured to read out an amount of charges generated by the piezoelectric material layer and captured by the second electrode plate connected therewith so as to determine a position of a touch point at which a press occurs.

Optionally, the plurality of touch control units are arranged in an array, and the first electrode plates of the touch control units in a same row are connected to a same one of the plurality of gate lines.

Further optionally, the piezoelectric material layer is made of a transparent material, and the piezoelectric material layers of every two or more adjacent ones of the plurality of touch control units are configured to be an integral structure.

Further optionally, the piezoelectric material layers of every two adjacent ones of the plurality of touch control units in a same column are configured to be an integral structure.

Further optionally, the second electrode plates of the touch control units, of which the piezoelectric material layers are configured to be an integral structure, are connected to a same one of the plurality of read lines.

Optionally, the second electrode plates of every two adjacent ones of the plurality of touch control units in a same column are connected to a same one of the plurality of read lines.

Optionally, a plurality of data lines are further disposed on the base substrate, the plurality of gate lines and the plurality of data lines intersect with and are insulated from each other, each intersection of the plurality of gate lines and the plurality of data lines defining one pixel unit; each of the pixel units includes a thin film transistor; wherein the first electrode plates of the touch control units and gate electrodes of the thin film transistors are disposed at a same layer and made of a same material, and the second electrode plates, the read lines and source and drain electrodes of the thin film transistors are disposed at a same layer and made of a same material.

Further optionally, each of the pixel units is provided with one of the plurality of touch control units therein; the first electrode plate in each of the plurality of touch control units and a gate electrode of the thin film transistor corresponding thereto are configured to be an integral structure; the piezoelectric material layer is disposed on the first electrode plate; and the second electrode plate is in contact with the piezoelectric material layer via a through hole which penetrates through an interlayer insulation layer interposed between a layer where the gate electrode is located and a layer where the source and drain electrodes are located.

Optionally, the touch substrate further includes a processing unit connected to the plurality of read lines and configured to determine the position of the touch point based on signals inputted through the plurality of read lines.

Optionally, the piezoelectric material layer is made of zinc oxide or kynar.

According to another aspect of the present disclosure, there is provided a method for driving the above touch substrate, the method including a display period and a touch control period; wherein the method includes: in the touch control period, providing the constant voltage to the first electrode plates of the touch control units through the gate lines, and reading out, through the read lines, the amount of charges generated by the piezoelectric material layers and captured by the second electrode plates connected with the read lines so as to determine the position of the touch point.

Optionally, the plurality of data lines are further disposed on the base substrate, the plurality of gate lines and the plurality of data lines intersect with and are insulated from each other, each intersection of the plurality of control lines and the plurality of read lines defining one pixel unit; each of the pixel units includes the thin film transistor; the first electrode plates of the touch control units and the gate electrodes of the thin film transistors are disposed at a same layer and made of a same material, and the second electrode plates, the read lines and the source and drain electrodes of the thin film transistors are disposed at a same layer and made of a same material; the method includes, in the display period: inputting gate scanning signals to the gate lines sequentially to provide, through the gate lines, gate turning-on voltage signals to the gate electrodes of the thin film transistors connected with the gate lines, respectively, such that the pixel units are charged, via the thin film transistors, with data voltage signals on the data lines corresponding to the thin film transistors, respectively, thereby realizing display.

According to still another aspect of the present disclosure, there is provided a display apparatus including the above touch substrate.

Optionally, pressure conduction pillars are disposed, at positions corresponding to the touch control units, on a counter substrate, and the pressure conduction pillars and the touch substrate are provided with a gap therebetween.

Further optionally, spacers are provided between the counter substrate and the touch substrate, the pressure conduction pillars and the spacers being disposed in a same layer and made of a same material.

The beneficial effects of the present disclosure are as follows.

The gate lines of the touch substrate in the embodiments of the present invention are not only used, in the display period, to provide gate turning-on voltage signals to pixel units of the touch substrate, but also used, in the touch control period, to provide constant voltages to the first electrode plates of the touch control units connected therewith. The piezoelectric material layer is disposed between the first electrode plate and the second electrode plate of the touch control unit and in contact with both of the first and second electrode plates, and thus in the touch control period, an amount of charges, generated by the piezoelectric material layer of the touch control unit being subjected to a pressure, is changed, resulting in that an amount of charges captured by the second electrode plate is changed, and the position of the touch point can be determined by reading out the amount of charges on the second electrode plate.

DETAILED DESCRIPTION

To make those skilled in the art better understand the technical solutions of the present disclosure, the present disclosure will be further described in detail below in conjunction with the accompanying drawings and specific implementations.

Embodiment 1

Figure 1:
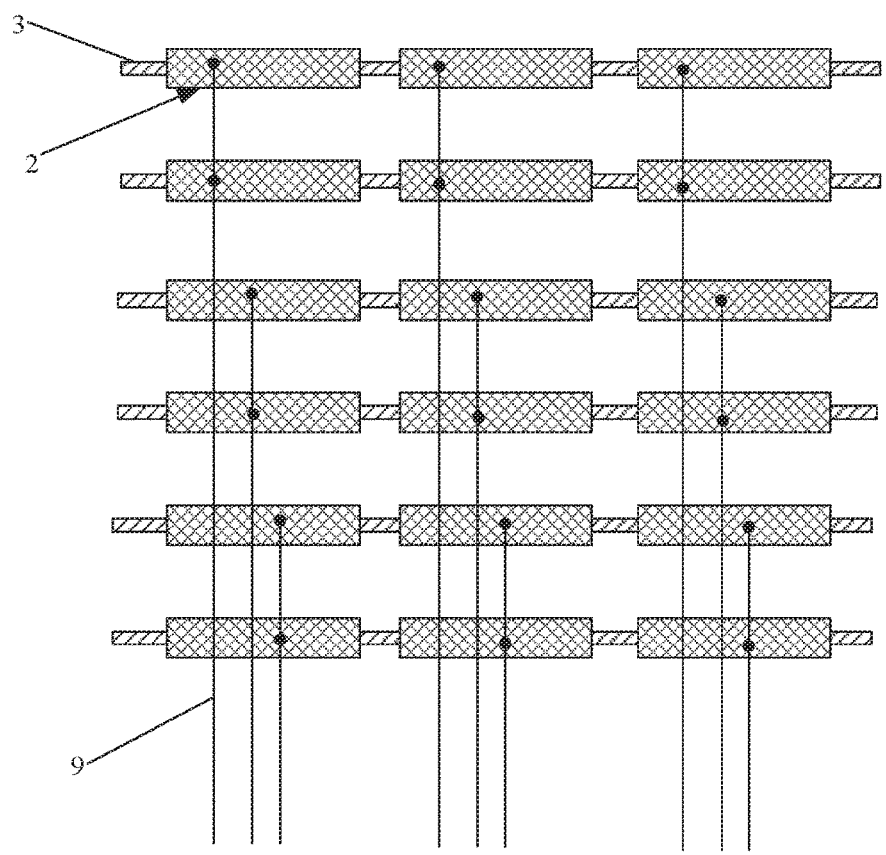
FIG. 1 is a schematic diagram of an example of a touch substrate in Embodiment 1 of the present invention.
Figure 2:
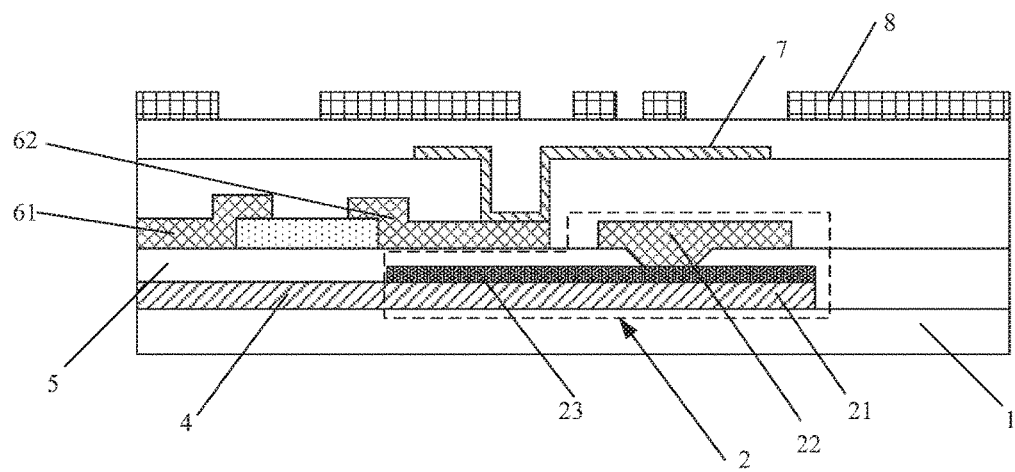
FIG. 2 is a cross-sectional diagram of a touch substrate in Embodiment 1 of the present invention.
Figure 3:
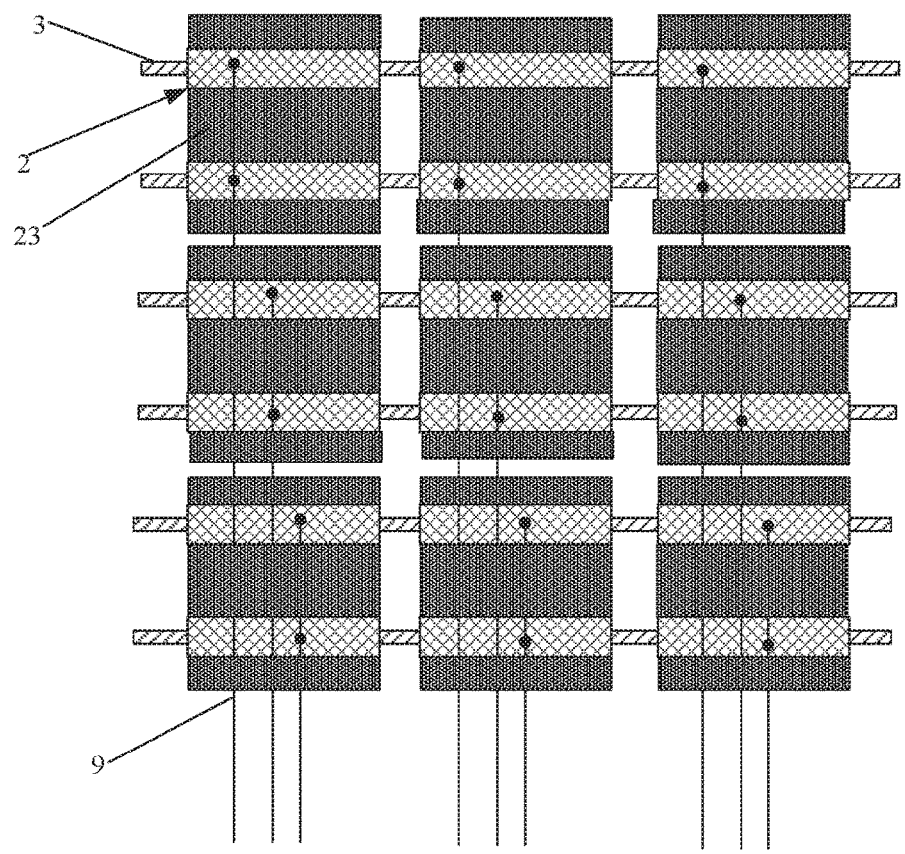
FIG. 3 is a schematic diagram of another example of a touch substrate in Embodiment 1 of the present invention.

As illustrated in FIGS. 1 to 3, the present embodiment provides a touch substrate, which includes a base substrate 1, and a plurality of touch control units 2, a plurality of gate lines 3 and a plurality of read lines 9 disposed on the base substrate 1. Each of the touch control units 2 includes a first electrode plate 21, a piezoelectric material layer 23 and a second electrode plate 22 sequentially disposed on the base substrate 1. The first electrode plate 21 of each touch control unit 2 is connected to one gate line 3, and the second electrode plate 22 of each touch control unit 2 is connected to one read line 9. The gate line 3 is configured to provide, during a touch control period, a constant voltage to the first electrode plate 21 connected therewith. The read line 9 is configured to read out an amount of charges generated by the piezoelectric material layer 23 and captured by the second electrode plate 22 connected therewith so as to determine a position of a touch point.

The gate lines 3 of the touch substrate in the present embodiment are not only used, in a display period, to provide gate turning-on voltage signals to pixel units of the touch substrate, but also used, in the touch control period, to provide constant voltages to the first electrode plates 21 of the touch control units 2 connected therewith. The piezoelectric material layer 23 is disposed between the first electrode plate 21 and the second electrode plate 22 of the touch control unit 2 and in contact with both of the first and second electrode plates, and thus in the touch control period, an amount of charges, generated by the piezoelectric material layer 23 of the touch control unit 2 being subjected to a pressure, is changed, resulting in that an amount of charges captured by the second electrode plate 22 is changed, and the position of the touch point can be determined by reading out the amount of charges on the second electrode plate 22.

As illustrated in FIG. 1, as a preferable implementation of the present embodiment, the touch control units 2 are arranged in an array in the touch control substrate, and the first electrode plates 21 of the touch control units 2 in a same row are connected to a same gate line 3. Such the arrangement eases the wiring.

Specifically, as illustrated in FIG. 2, it can be understood by those skilled in the art that, the touch substrate includes not only the plurality of (multiple rows of) gate lines 3 but also a plurality of data lines (not shown in the drawings) intersecting with and insulated from the plurality of gate lines 3, and each intersection of the plurality of gate lines and the plurality of data lines defines one pixel unit. Needless to say, it will be appreciated that the pixel units are arranged in a matrix. In this case, each pixel unit may be provided with a touch control unit 2 therein. Each of the pixel units is provided with a thin film transistor therein. Gate electrodes 4 of the thin film transistors of the pixel units in a same row are connected to a same gate line 3. Source electrodes 61 of the thin film transistors of the pixel units in a same column are connected to a same data line. Drain electrodes 62 of the thin film transistors are connected to pixel electrodes 7 of corresponding pixel units, respectively.

In the display period: the gate lines 3 provide gate turning-on voltage signals to the gate electrodes 4 of the thin film transistors connected with the gate lines 3, respectively, such that the pixel units are charged, via the thin film transistors, with data voltage signals on the data lines (i.e., the data lines connected to the source electrodes 61 of respective thin film transistors) corresponding to the thin film transistors, respectively, thereby realizing display.

In the touch control period: since each of the gate lines 3 is also connected to the first electrode plates 21 of the touch control units 2 in a same row, in this period, the gate lines 3 provide a constant voltage to the first electrode plates 21 connected therewith. In this case, the piezoelectric material layers 23 will generate a certain amount of charges due to the piezoelectric effect. When a certain touch control unit 2 is subjected to an external pressure, the amount of charges generated by the piezoelectric material layer 23 thereof is changed, and thus an amount of charges captured by the second electrode plate 22 is changed. Then the position of the touch point can be determined by reading out the amount of charges on the second electrode plate 22.

Optionally, the first electrode 21 of the touch control unit 2 and the gate electrode 4 of the thin film transistor are configured to be an integral structure, namely, both of them are formed by one patterning process. After the first electrode plate 21 and the gate electrode 4 are formed, the piezoelectric material layer 23 is formed directly on the first electrode 21 of the touch control unit 2. The second electrode 22 of the touch control unit 2 may be disposed at a same layer as the source and drain electrodes 61 and 62 of the thin film transistor and made of a same material, namely, the second electrode 22 and the source and drain electrodes 61 and 62 may be formed by one patterning process. In each touch control unit 2, the second electrode plate 22 needs to be electrically connected to the piezoelectric material layer 23, so it needs to etch an interlayer insulation layer 5 (gate insulation layer) interposed between the layer where the gate electrode 4 of the thin film transistor is located and the layer where the source and drain electrodes 61 and 62 are located to form a through hole, such that the second electrode plate 22 contacts the piezoelectric material layer 23 via the through hole.

In view of the above, the touch substrate of the present embodiment has low production cost and is easy to prepare. It should be noted that the type of the thin film transistor is not limited in the present embodiment, namely, it may be a top-gate thin film transistor or a bottom-gate thin film transistor.

Optionally, in order to improve the sensitivity of the touch substrate, the second plates 22 of every two adjacent touch control units 2 in a column direction may be connected to a same read line 9. That is, every two adjacent touch control units 2 in the column direction constitute one touch control block. Since an area (i.e., an area under pressure, or touch control area) of two touch control units 2 in contact with an object exerting pressure is larger than that of one touch control unit 2, a change in the amount of charges generated by the piezoelectric material layer 23 is also large, so that it is easier to read out a pressure data through the read line 9, thereby improving the sensitivity of the touch substrate. Needless to say, depending on the dimension of the touch substrate, two or more adjacent touch control units 2 may constitute one touch control block and be connected to a same read line 9. Preferably, the read line 9 and the data line are disposed at a same layer and made of a same material. In this case, the read line 9, the source and drain electrodes 61 and 62 of the thin film transistor, and the second electrode plate 22 may be formed by one patterning process, thereby saving the production cost and simplifying the process steps.

Optionally, the material of the piezoelectric material layer of the above touch substrate includes zinc oxide or kynar having the piezoelectric effect. Needless to say, other materials having the piezoelectric effect may also be used and not listed in detail herein.

Optionally, the touch substrate further includes a processing unit connected to the read lines 9 and configured to determine the position of the touch point based on signals inputted through the read lines 9.

In other embodiments, the material of the piezoelectric material layer 23 of the above touch substrate may be a transparent material, the piezoelectric material layers 23 of every two or more adjacent touch control units 2 are configured to be an integral structure, and the second electrode plates 22 of the two or more touch control units 2, of which the piezoelectric material layers 23 are configured to be an integral structure, are connected to a single read line 9. By such the arrangement, multiple touch control units 2 constitute one touch control block so as to increase a touch control area of the touch control units connected to the same read line 9, thereby improving the sensitivity of touch control.

Specifically, as illustrated in FIG. 3, the piezoelectric material layers 23 of every two adjacent touch control units 2 in a same column are configured to be an integral structure, and the second electrode plates 22 of the two touch control units 2, of which the piezoelectric material layers 23 are configured to be an integral structure, are connected to a single read line 9. As such, the sensitivity of the touch substrate can be improved. Similarly, it is a feasible alternative that the piezoelectric material layers 23 of every two adjacent touch control units 2 in a same row are configured to be an integral structure, and the second electrode plates 22 of the two touch control units 2, of which the piezoelectric material layers 23 are configured to be an integral structure, are connected to a single read line 9. Needless to say, it is also a feasible alternative that the piezoelectric material layers 23 of multiple adjacent touch control units 2 arranged in a matrix are configured to be an integral structure, and the second electrode plates 22 of the multiple touch control units 2, of which the piezoelectric material layers 23 are configured to be an integral structure, are connected to a single read line 9, which is not described in detail herein.

Needless to say, the touch substrate may further include other known structures such as a planarization layer, a pixel electrode 7, and a common electrode 8, regardless the specific structure of the touch substrate.

Embodiment 2

The present embodiment provides a method for driving the touch substrate in the Embodiment 1. The method includes a display period and a touch control period.

In the display period: the gate lines 3 are provided with gate scanning signals sequentially to provide gate turning-on voltage signals, through the gate lines 3, to the gate electrodes 4 of the thin film transistors connected with the gate lines 3, respectively, such that the pixel units are charged, via the thin film transistors, with data voltage signals on corresponding data lines, respectively, and realize display.

In the touch control period: since each of the gate lines 3 is also connected to the first electrode plates 21 of the touch control units 2 in a same row, in this period, the gate lines 3 are provided with a constant voltage to apply the constant voltage to the first electrode plates 21 connected therewith. In this case, the piezoelectric material layers 23 will generate a certain amount of charges due to the piezoelectric effect. When a certain touch control unit 2 is subjected to an external pressure, the amount of charges generated by the piezoelectric material layer 23 thereof is changed, and thus an amount of charges captured by the second electrode plate 22 is also changed. Then the position of the touch point can be determined by reading out the amount of charges on the second electrode plate 22.

Embodiment 3

The present embodiment provides a display apparatus including the touch substrate in Embodiment 1 and a counter substrate arranged opposite to and aligned with the touch substrate.

Figure 4:
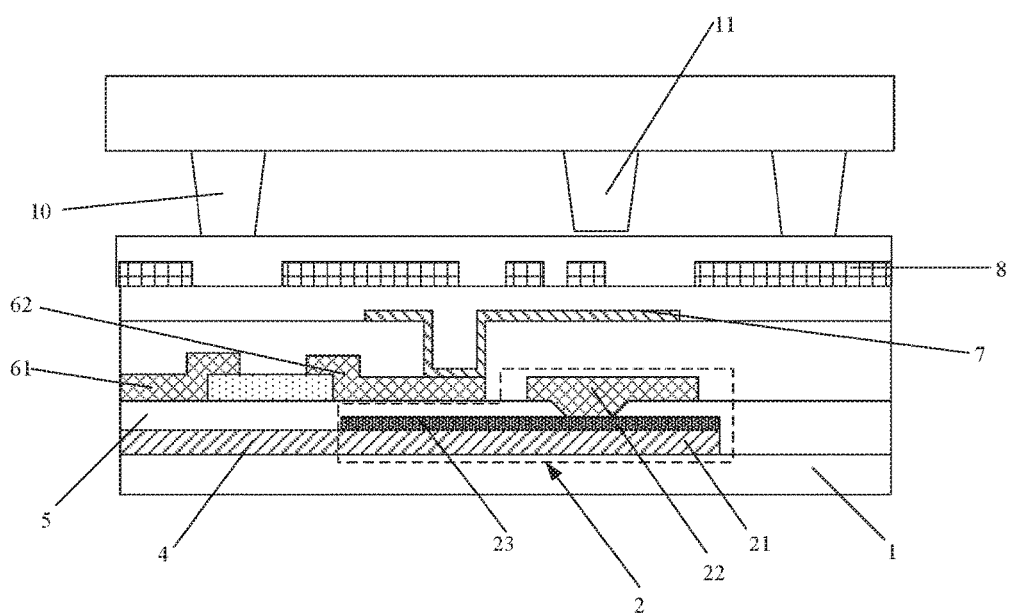
FIG. 4 is a schematic diagram of a display apparatus in Embodiment 3 of the present invention.

As illustrated in FIG. 4, the touch substrate may be an OLED backplane or an array substrate, and pressure conduction pillars 11 are disposed, at positions corresponding to the touch control units 2, on the counter substrate of the display apparatus, with a gap provided between the pressure conduction pillars 11 and the touch substrate. When a pressing occurs on the touch substrate, a pressure is conducted by the pressure conduction pillars 11 to the touch control units 2 so as to detect the position of the touch point. Typically, spacers 10 are provided between the counter substrate and the touch substrate. Since the pressure conduction pillars 11 and the spacers 10 are disposed in a same layer and made of a same material, the number of process steps will not be increased and the cost is low.

The display apparatus of the present embodiment may be any product or component with display function, such as a liquid crystal panel, an OLED panel, an electronic paper, a mobile phone, a tablet computer, a television, a monitor, a laptop computer, a digital album, a navigator or the like.

It can be understood that the foregoing implementations are merely exemplary embodiments used for describing the principle of the present invention, but the present disclosure is not limited thereto. Those of ordinary skill in the art may make various variations and improvements without departing from the spirit and essence of the present disclosure, and these variations and improvements shall also fall into the protection scope of the present disclosure.

What is claimed is:

1. A touch substrate, comprising a base substrate and a plurality of touch control units and a plurality of gate lines disposed on the base substrate, wherein
   the touch substrate further comprises a plurality of read lines disposed on the base substrate;
   each of the plurality of touch control units comprises a first electrode plate, a piezoelectric material layer and a second electrode plate sequentially disposed on the base substrate;
   the first electrode plate is connected to one of the plurality of gate lines, and the second electrode plate is connected to one of the plurality of read lines;
   each of the gate lines is configured to provide, during a touch control period, a constant voltage to the first electrode plate connected therewith; and
   each of the read lines is configured to read out an amount of charges generated by the piezoelectric material layer and captured by the second electrode plate connected therewith so as to determine a position of a touch point.

2. The touch substrate according to claim 1, wherein the plurality of touch control units are arranged in an array, and the first electrode plates of the touch control units in a same row are connected to a same one of the plurality of gate lines.

3. The touch substrate according to claim 2, wherein the piezoelectric material layer is made of a transparent material, and the piezoelectric material layers of every two or more adjacent ones of the plurality of touch control units are configured to be an integral structure.

4. The touch substrate according to claim 3, wherein the piezoelectric material layers of every two adjacent ones of the plurality of touch control units in a same column are configured to be an integral structure.

5. The touch substrate according to claim 3, wherein the second electrode plates of the touch control units, of which the piezoelectric material layers are configured to be an integral structure, are connected to a same one of the plurality of read lines.

6. The touch substrate according to claim 2, wherein the second electrode plates of every two adjacent ones of the plurality of touch control units in a same column are connected to a same one of the plurality of read lines.

7. The touch substrate according to claim 1, wherein a plurality of data lines are further disposed on the base substrate, the plurality of gate lines and the plurality of data lines intersect with and are insulated from each other, each intersection of the plurality of gate lines and the plurality of data lines defining one pixel unit;
   each of the pixel units comprises a thin film transistor; and
   the first electrode plates of the touch control units and gate electrodes of the thin film transistors are disposed at a same layer and made of a same material, and the second electrode plates, the read lines, and source and drain electrodes of the thin film transistors are disposed at a same layer and made of a same material.

8. The touch substrate according to claim 7, wherein each of the pixel units is provided with one of the plurality of touch control units therein;
   the first electrode plate in each of the plurality of touch control units and a gate electrode of the thin film transistor corresponding to the touch control unit are configured to be an integral structure;
   the piezoelectric material layer is disposed on the first electrode plate; and
   the second electrode plate is in contact with the piezoelectric material layer via a through hole which penetrates through an interlayer insulation layer interposed between a layer where the gate electrode is located and a layer where the source electrode and the drain electrode are located.

9. The touch substrate according to claim 1, wherein the touch substrate further comprises a processing unit connected to the plurality of read lines and configured to determine the position of the touch point based on signals inputted through the plurality of read lines.

10. The touch substrate according to claim 1, wherein the piezoelectric material layer is made of zinc oxide or kynar.

11. A method for driving the touch substrate according to claim 1, the method comprising a display period and a touch control period; wherein the method comprises: in the touch control period,
    providing, through the gate lines, the constant voltage to the first electrode plates of the touch control units; and
    reading out, through the read lines, the amount of charges generated by the piezoelectric material layers and captured by the second electrode plates connected with the read lines so as to determine the position of the touch point.

12. The method according to claim 11, wherein
    in the touch substrate, a plurality of data lines are further disposed on the base substrate, the plurality of gate lines and the plurality of data lines intersect with and are insulated from each other, each intersection of the plurality of gate lines and the plurality of data lines defining one pixel unit; each of the pixel units comprises a thin film transistor; and the first electrode plates of the touch control units and gate electrodes of the thin film transistors are disposed at a same layer and made of a same material, and the second electrode plates, the read lines, and source and drain electrodes of the thin film transistors are disposed at a same layer and made of a same material, and the method further comprises: in the display period, inputting gate scanning signals to the gate lines sequentially to provide, through the gate lines, gate turning-on voltage signals to the gate electrodes of the thin film transistors connected with the gate lines, respectively, such that the pixel units are charged, via the thin film transistors, with data voltage signals on the data lines corresponding to the thin film transistors, respectively, thereby realizing display.

13. A display apparatus, comprising the touch substrate according to claim 1, and a counter substrate arranged opposite to and aligned with the touch substrate.

14. The display apparatus according to claim 13, wherein the counter substrate is provided with pressure conduction pillars thereon at positions corresponding to the touch control units, and the pressure conduction pillars and the touch substrate are provided with a gap therebetween.

15. The display apparatus according to claim 14, wherein spacers are provided between the counter substrate and the touch substrate, the pressure conduction pillars and the spacers being disposed in a same layer and made of a same material.

* * * * *